United States Patent [19]

Horgan

[11] Patent Number: 4,696,159
[45] Date of Patent: Sep. 29, 1987

[54] GAS TURBINE OUTLET ARRANGEMENT

[75] Inventor: John J. Horgan, Wethersfield, Conn.

[73] Assignee: United Technologies Corporation, Hartford, Conn.

[21] Appl. No.: 892,532

[22] Filed: Aug. 4, 1986

[51] Int. Cl.$^4$ .............................................. F02K 3/02
[52] U.S. Cl. ...................................... 60/226.1; 60/262
[58] Field of Search ............... 60/261, 262, 263, 264, 60/749, 226.1, 271, 39.5; 181/213, 220

[56] References Cited

U.S. PATENT DOCUMENTS

| | | | |
|---|---|---|---|
| 3,377,804 | 4/1968 | Wright et al. | 60/262 |
| 3,514,955 | 6/1970 | Paulson et al. | 60/262 |
| 3,696,617 | 10/1972 | Ellis | 60/262 |
| 3,750,402 | 8/1973 | Vdoviak et al. | 60/262 |
| 4,117,671 | 1/1979 | Neal et al. | 60/262 |
| 4,135,363 | 1/1979 | Packman | 60/262 |
| 4,222,235 | 9/1980 | Adamson et al. | 60/226.1 |
| 4,226,297 | 10/1980 | Cicon | 60/262 |
| 4,298,089 | 11/1981 | Birch et al. | 181/213 |
| 4,543,784 | 10/1985 | Kirker | 60/262 |
| 4,592,201 | 6/1986 | Dusa et al. | 60/262 |

*Primary Examiner*—Louis J. Casaregola
*Assistant Examiner*—Timothy S. Thorpe
*Attorney, Agent, or Firm*—Troxell K. Snyder

[57] ABSTRACT

An outlet section for a turbofan gas turbine engine (10) includes an internal flow separator (24), and a small convoluted mixer (28) for initiating mixing between the coaxial fan air stream (22) and hot core engine exhaust gas (26). Mixing is enhanced by an increasing-decreasing diameter nozzle plug (38), having a maximum diameter (40) proximate the annular outlet opening (16). The downstream edge (42) of the outer engine fairing (14) is turned radially inward for enhancing forward thrust in cooperation with the decreasing diameter surface (18) of the plug (38).

6 Claims, 3 Drawing Figures

GAS TURBINE OUTLET ARRANGEMENT

FIELD OF THE INVENTION

The present invention relates to a gas turbine engine, and more particularly, to the outlet of a gas turbine engine.

BACKGROUND

Gas turbine engines have been used in the commercial air transport industry for over 30 years. One particular species of engine, termed the "axial flow turbofan", has found wide acceptance and is used as the prime mover in a significant fraction of the current air transport fleet.

The turbofan engine operates by ingesting an axial flow stream of air at the forward end, separating the ingested airstream into an annular fan airflow stream and an inner, coaxial core airflow. The core airflow is further compressed within the engine, subsequently passing through a combustor section wherein liquid fuel is burned to raise the temperature and then through a turbine section wherein the energy of the high temperature, high pressure, high velocity core gas flow is extracted mechanically for driving the upstream air compressor and fan.

The still-hot exhaust gas from the core of the engine is then typically discharged at the downstream end of the engine. The fan airflow and core exhaust gas flow together generate sufficient thrust upon discharge to drive an airframe or the like. It is common practice today to either discharge the annular fan airstream immediately downstream of the fan section, or to contain the fan airstream within an annular flow passage by an outer engine fairing to a downstream point proximate the aft end of the engine.

Historic performance requirements for axial flow turbofan engines used in the air transport industry have specified the provision of high axial thrust at a minimum fuel consumption rate. Due to increased population density and raised environmental consciousness, recent regulations have been enacted requiring a reduction in the level of noise generated by such engines in the vicinity of airports and/or population centers.

While there are several sources of objectionable noise in an axial flow turbofan engine, one particular identified noise generator is the direct discharge of the high velocity, high temperature core gas from the engine. It has been predicted that a 2-3 db drop in overall engine sound generation level may be expected if the discharged core gas and bypass fan air are thoroughly intermixed prior to discharge from the engine. Moreover, the separate discharge of the core gas and bypass fan air in a turbofan engine results in a predicted 1-2 percent loss in overall engine thrust as compared to a fully mixed discharge stream. The advantages of mixing the bypass fan air and core engine exhaust are thus well known in the art.

Prior art mixers have included certain inherent drawbacks which have diminished their attractiveness to both engine and aircraft designers. Such prior systems typically involve a tradeoff between the axial length of the mixing zone and the pressure (and hence energy) loss experienced through the mixing section. By allowing the coaxial streams to mix together without mechanical encouragement, an excessively long axial mixing zone is established. By encouraging mixing in a short axial distance by the use of a convoluted mixing ring or the like, designers have experienced frictional pressure, turbulence, and other internal fluid losses which act to negate the benefits obtained through the mixed discharge of the core and bypass airflows.

SUMMARY OF THE INVENTION

It is therefore an object of the present invention to reduce the emitted sound of a gas turbine engine or the like by providing a uniform temperature and velocity mixed discharge gas flow.

It is further an object of the present invention to accomplish such mixing in a relatively short distance and wholly within the engine prior to discharging the mixed gas at subsonic velocity from the engine outlet section.

It is still further an object of the present invention to accomplish such mixing and discharge while increasing overall engine forward thrust.

The present invention provides an exhaust outlet arrangement for a turbofan gas turbine engine wherein mixing of the hot core gas flow and the surrounding cool bypass fan air is accomplished within the engine with a minimum of internal fluid frictional loss. The mixed gas exits the engine as a single discharge stream having a substantially uniform temperature and velocity profile, a condition which significantly reduces the operating noise level. The arrangement further provides means for recovering additional thrust from the discharged gas.

Mixing of the core gas flow and fan airflow is initiated by a small annular convoluted mixer, placed between the coaxial core and fan flow streams at the entrance to the engine outlet section. The convoluted mixer initiates movement of the core flow outward and the fan flow inward, increasing the mixing interface of the two flows at the exit of the mixer. The mixing continues freely downstream in a convergent flow area defined by an increasing diameter axial nozzle plug and an outer engine fairing.

The nozzle plug reaches a maximum diameter just upstream of the nozzle exit plane defined by the downstream edge of the engine fairing, thus forming an annular nozzle throat which is at an angle relative to the annular outlet opening whence the mixed gas is discharged at high velocity. The nozzle plug tapers radially downstream of the nozzle throat, providing additional thrust recovery from the discharged mixed gas which is further augmented in flight by external flow following the radially inward curve of the downstream edge of the engine fairing.

DETAILED DESCRIPTION OF THE PREFERRED EMBODIMENT

Figure 1:
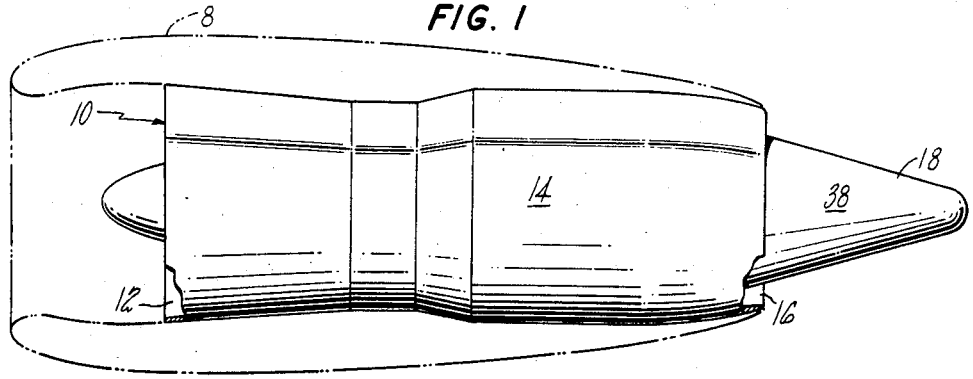
FIG. 1 shows an exterior view of a turbofan gas turbine engine utilizing an outlet arrangement according to the present invention.

FIG. 1 shows an exterior view of an axial flow gas turbine engine in a nacelle 8 and utilizing an exhaust outlet arrangement according to the present invention. The engine 10 has a forward, upstream intake 12 and an outer engine fairing 14 for ducting the bypass fan air aft. The core gas flow and bypass fan air, mixed as described hereinbelow, are discharged through an annular opening 16 at the aft or downstream end of the engine 10. The decreasing diameter structure protruding downstream of the nozzle throat 17 is the external expansion portion 18 of the nozzle plug 38, also described more clearly hereinbelow.

Figure 2:
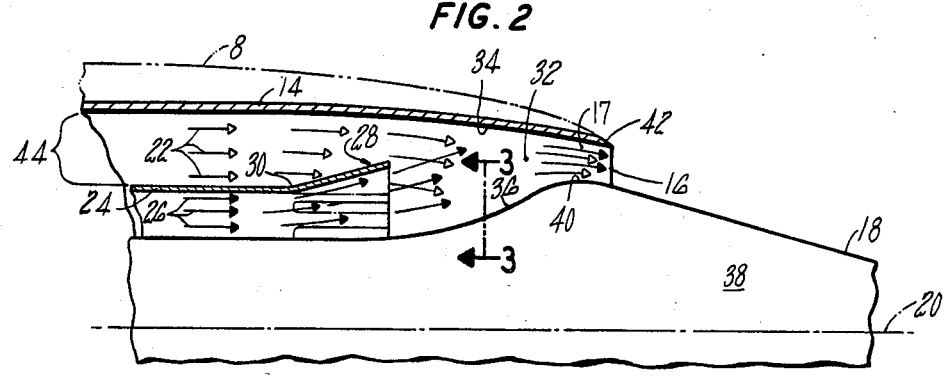
FIG. 2 shows an axial cross sectional view of the outlet section of a turbofan engine according to the present invention.

FIG. 2 shows a cross section of the exhaust outlet arrangement according to the present invention viewed in the plane of the engine central axis 20. The outer engine fairing 14 is seen as an annular structure, defining the outer flow boundary 34 of the annular fan bypass airstream 22. An annular flow divider 24 separates the relatively cool fan stream 22 from the relatively hot, coaxial cool engine exhaust gas stream 26.

Figure 3:
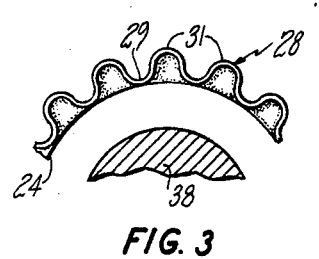
FIG. 3 shows a view of the convoluted mixer as indicated in FIG. 2.

Mixing between the coaxial air and streams 22, 26 is initiated by a small convoluted mixer 28 shown attached to the trailing edge 30 of the flow divider 24. The annular mixer 28 is comprised of a plurality of inwardly and outwardly fluted lobes 29, 31, as may be clearly seen in FIG. 3.

The convoluted mixer initiates the mixing by conducting a portion of the inner core gas stream 26 outwardly and a portion of the outer fan airstream 22 inwardly. The mixer 28 is shaped to prevent flow separation and associated turbulence losses. Actual intermixing of the two flows 22, 26 begins at the exit of the convoluted mixer 28 and continues downstream in the convergent flow volume 32 defined by the inner surface 34 of the outer fairing 14 and the increasing diameter portion 36 of the nozzle plug 38.

As will be appreciated by those skilled in the art, the axial mixing length required to fully mix two coaxial gas streams 22, 26 is a function of the transverse rate of intermixing of the free flowing streams, the mixing interface area, average gas velocity, and the height of the mixed flow passage. The nozzle throat area for unaugmented gas turbine engines is sized responsive to the engine design and operating conditions, thus placing a constraint on the design of the engine outlet section.

The outlet arrangement according to the present invention maintains the optimal nozzle throat area while providing a reduced mixed flow passage height defined between the enlarged nozzle plug 36 and the outer engine fairing 14. The increased diameter flow annulus resulting from the enlarged plug 36 further enhances the mixing of the gas streams 22, 26 by increasing the area of fan air-core gas stream interface as the gases move toward the annular outlet opening 16.

The outlet arrangement of the present invention further provides a region of relatively low velocity gas and air flow within the engine 10 allowing the lobe angle of the small mixer 38 to be as large as 15° without experiencing separations and pressure losses in the coaxial gas streams as would occur in prior art outlet arrangements. Internal fluidic pressure loss is further reduced by minimizing the size of the mixer 28. It has been found by calculation that the maximum mixing effect with an acceptable frictional and momentum energy loss is provided by a convoluted mixer which extends axially for a distance approximately equivalent to the radial height of the upstream annular flow channel 44. Such a low loss mixer further has an angular deviation from the axial incoming gas flow streams averaging about 15° to insure nonseparation of the gas boundary layer.

The point of maximum plug diameter 40 occurs at the nozzle throat 17 slightly forward of the outlet opening 16. The downstream portion 18 of the nozzle plug 38 tapers radially inward, decreasing at an angle of 15° (or with a diameter to longitudinal displacement ratio of 0.268 to 1). This taper is sufficiently slight to avoid detachment of the fluid boundary layer formed between the high velocity gases discharged from the outlet opening 16 and the surface 18 of the nozzle plug 38. By maintaining attachment of the gas boundary layer and avoiding the detached, recirculating flow regime, the present invention reduces fluidic drag on the engine structure, thus augmenting overall engine stress by a slight but desirable degree.

A still further reduction of external flow drag and an increase in forward thrust on the plug surface is achieved by a slight radially inward orientation of the downstream edge 42 of the outer fairing 14 as shown in FIG. 2. This last inward turn, being annularly parallel to the outer surface 18 of the nozzle plug 38, initially channels the mixed gas stream exiting the outlet opening 16 parallel to the decreasing diameter nozzle portion 18 thereby providing an additional positive pressure thereagainst as the discharged gases expand and decrease in velocity (hence increasing in static pressure).

The present invention thus provides a fully mixed outlet flow stream by initiating mixing between the core flow 26 and fan bypass airflow 22 by a small convoluted mixer 28, subsequently both reducing the height and increasing the mixing interface area in the gas flow channel in a convergent section 32 formed between the axial nozzle plug 38 and the outer engine fairing 14. The mixed, high velocity gas stream discharged from the annular outlet opening 16 is directed parallel to the tapering downstream surface 18 of the nozzle plug 38, avoiding flow separation and beneficially exerting positive static fluid pressure thereagainst during the external expansion of the discharged mixed gases.

As discussed hereinabove, the achievement of a mixed gas stream at the exit of a turbofan gas turbine engine results in a diminished level of generated sound caused by the interaction of the hot, high velocity core gas flow with the typically cool and relatively stagnant ambient air characteristic of takeoff and low speed flight at which time noise reduction is especially desirable. Hot core gases 26 are prevented from directly exiting the engine 10 by sizing the maximum diameter 40 of the nozzle plug 38 of its preferred embodiment to be at least equal to the diameter of its trailing edge of the flow separator 24. The core gases 26 are thus displaced radially outward into the fan air flow stream 22 before passing out of the annular outlet opening 16, ensuring complete mixing of the streams 22, 26.

Additionally, the downstream extending axial nozzle plug 38 provides a positive thrust benefit by providing a surface 18 against which the discharged high velocity exhaust gases may expand. The increase in thrust due to the trailing surface 18, when added to the increased thrust obtained by complete mixing of the bypass fan air and core engine gases, may provide an additional 1.5–2% thrust to a typical, current design gas turbine engine.

The exhaust configuration according to the present invention provides an additional benefit when an engine such equipped is utilized in a modern air transport craft wherein local area-ruling of the engine could provide a drag reduction. Typically this could occur when the engines are mounted in the tail portion of the aircraft. In prior art arrangements, well known to those in the transport industry, the transverse area of the aircraft and engines diminishes rapidly with longitudinal displacement at the tail portion. Certain aircraft in use today diminish in area so rapidly that drag is created by low static pressure and possible separation of the boundary layer from the rearmost surfaces of the fuselage and tail structure.

By utilizing an engine having an exhaust outlet arrangement according to the present invention, total aircraft cross sectional area is maintained and enlarged adjacent the tail structure, reducing the rate of area decrease in this vicinity, hence raising the local static pressure, reducing boundary layer separation and the aerodynamic drag caused thereby. It is estimated that the overall rate of fuel consumption for a given speed and load in a properly area-ruled aircraft may be reduced on the order of 1.5 to 2% over prior art blunt tailed engine airframe combinations.

It will thus be seen by those skilled in the art that the present invention, limited not by the hereinbefore disclosed preferred embodiment but only by the appended claims, is well adapted to achieve the objects and advantages either presented herein or as may occur to such a skilled individual following a thorough review of the foregoing specification and the appended claims and drawing figures.

I claim:

1. An engine outlet section for an axial-flow gas turbine engine having a hot core gas flow and a surrounding annular bypass fan air flow, comprising:
    an annular flow separator, separating the core gas from the fan air upstream of the outlet section and terminating at a circular trailing edge;
    an annular mixer, secured to the trailing edge of the flow separator, the mixer including a plurality of alternately radially inwardly and outwardly extending flow lobes, the outwardly extending lobes having a small radial height relative to the radial height of the fan air flow annulus;
    an axial nozzle plug, disposed downstream of the annular mixer and having a diameter increasing with axial downstream displacement to a maximum diameter greater than or equal to the diameter of the trailing edge of the flow separator, said plug diameter decreasing with further downstream axial displacement; and
    an outer annular engine fairing, confining the fan air upstream of the convoluted mixer and confining the mixing fan air and core gas flow downstream of the mixer, the outer engine fairing further terminating at a downstream edge at a point axially proximate the maximum diameter of the nozzle plug.

2. The engine outlet section as recited in claim 1, wherein
    the diameter of the nozzle plug downstream of the maximum decreases linearly with respect to downstream axial displacement at a rate of approximately 0.268 to 1.

3. The engine outlet section as recited in claim 2, wherein
    the downstream edge of the outer engine fairing curves radially inward for directing the mixed gas flow along an annular flow path locally parallel to the surface of the nozzle plug downstream plug maximum diameter.

4. The engine outlet section as recited in claim 1, wherein
    the convoluted mixer extends downstream from the downstream edge of the flow separator for a distance equivalent in magnitude to the radial height of the fan air flow annulus.

5. The engine outlet section as recited in claim 4, wherein
    each of the plurality of alternately radially inwardly and outwardly extending flow lobes forms an angle of approximately 15° with the axial flow direction.

6. The engine outlet section as recited in claim 1, wherein
    the maximum outward radial displacement of the annular mixer is approximately 27% of the height of the annular fan air flow upstream of the annular mixer.

* * * * *